United States Patent
Hansen et al.

(10) Patent No.: US 10,845,023 B2
(45) Date of Patent: Nov. 24, 2020

(54) VEHICLE LAMP LIGHT BLOCKING

(71) Applicant: Flex-N-Gate Advanced Product Development, LLC, Tecumseh (CA)

(72) Inventors: David Bjarne Hansen, Grand Rapids, MI (US); Ronie George, Kentwood, MI (US)

(73) Assignee: Flex-N-Gate Advanced Product Development, LLC, Tecumseh (CA)

( * ) Notice: Subject to any disclaimer, the term of this patent is extended or adjusted under 35 U.S.C. 154(b) by 0 days.

(21) Appl. No.: 16/572,997

(22) Filed: Sep. 17, 2019

(65) Prior Publication Data

US 2020/0088380 A1 Mar. 19, 2020

Related U.S. Application Data

(60) Provisional application No. 62/732,279, filed on Sep. 17, 2018.

(51) Int. Cl.
*F21S 43/50* (2018.01)
*F21S 43/14* (2018.01)
(Continued)

(52) U.S. Cl.
CPC ............ *F21S 43/50* (2018.01); *B60Q 1/2696* (2013.01); *B60Q 1/50* (2013.01); *F21S 43/14* (2018.01); *F21S 43/195* (2018.01); *F21S 43/255* (2018.01); *F21S 43/26* (2018.01); *F21S 43/30* (2018.01); *F21S 43/40* (2018.01);
(Continued)

(58) Field of Classification Search
CPC .. F21S 43/50; F21S 43/14; F21S 43/30; F21S 43/255
See application file for complete search history.

(56) References Cited

U.S. PATENT DOCUMENTS 9,840,191 B1 12/2017 Salter et al.
10,443,790 B2 10/2019 George et al.
(Continued)

FOREIGN PATENT DOCUMENTS

| WO | 2009/042252 A1 | 4/2009 |
| WO | 2016/191321 A1 | 12/2015 |
| WO | 2017/125450 A1 | 7/2017 |

OTHER PUBLICATIONS

PCT Patent Application No. PCT/US2019/051418 International Search Report and Written Opinion dated Dec. 12, 2019.

*Primary Examiner* — Anne M Hines
(74) *Attorney, Agent, or Firm* — Erise IP, P.A.

(57) ABSTRACT

A vehicle lamp includes one or more LEDs mounted to a printed circuit board for producing light. One or more inner lenses are coupled to LEDs for receiving light such that light enters along an edge or surface of each inner lens and propagates through each inner lens before exiting. A projection lens is oriented adjacent the inner lenses such that the projection lens receives light from the inner lenses and projects the light from the vehicle lamp. A light blocking material is applied to at least a portion of the projection lens for altering an appearance of light emitted from the projection lens. The resulting projections provide custom lit appearances having varying patterns, intensity, texture, and/or color. The vehicle lamp may be used for satisfying vehicle lamp legal functions, welcome functions, autonomous driving functions, and/or logo functions.

20 Claims, 6 Drawing Sheets

(51) Int. Cl.
   *F21S 43/19*    (2018.01)
   *F21S 43/30*    (2018.01)
   *F21S 43/20*    (2018.01)
   *F21S 43/40*    (2018.01)
   *B60Q 1/50*     (2006.01)
   *B60Q 1/26*     (2006.01)
   *G05D 1/02*     (2020.01)
   *F21Y 115/10*   (2016.01)
   *F21W 103/00*   (2018.01)
   *F21W 104/00*   (2018.01)
   *B60R 13/00*    (2006.01)

(52) U.S. Cl.
   CPC ........ *B60R 13/005* (2013.01); *F21W 2103/00* (2018.01); *F21W 2104/00* (2018.01); *F21Y 2115/10* (2016.08); *G05D 1/021* (2013.01)

(56) References Cited

U.S. PATENT DOCUMENTS

| | | |
|---|---|---|
| 2005/0174771 A1 | 8/2005 | Conner |
| 2011/0052839 A1* | 3/2011 | Pierce .................. B60R 13/005 428/31 |
| 2017/0314759 A1 | 11/2017 | Nykerk et al. |
| 2018/0252403 A1 | 9/2018 | Hamid et al. |
| 2018/0274745 A1 | 9/2018 | Nykerk et al. |
| 2019/0309924 A1 | 10/2019 | Nykerk et al. |

* cited by examiner

VEHICLE LAMP LIGHT BLOCKING

CROSS-REFERENCE TO RELATED APPLICATIONS

This application claims the benefit of U.S. Provisional Application No. 62/732,279 entitled "Vehicle Lamp Light Blocking" and filed on Sep. 17, 2018, which is herein incorporated by reference in its entirety.

BACKGROUND

1. Field of the Disclosure

Embodiments of this disclosure relate generally to the field of light assemblies for use in vehicles. More specifically, embodiments of this disclosure include inks applied to light assemblies for achieving desired lighting effects.

2. Description of the Related Art

U.S. Pat. No. 7,804,418 to Sullivan et al. discloses a light assembly for a vehicle that includes a lens having one or more ink markings. At least a portion of the ink marking is configured such that it appears generally opaque to a viewer when unlit, while appearing translucent when lit by a light source.

U.S. Pat. No. 7,137,718 to Egashira discloses an automotive lamp having a polarizing film or layer provided on a lamp cover. Fine textured structures of the film enable color variations between lit and unlit conditions.

SUMMARY

In an embodiment, a vehicle lamp assembly includes a light source for producing light, an inner lens that receives light from the light source and redirects the light, a projection lens that receives light from the inner lens and shapes light for projecting from a vehicle lamp assembly, and a light blocking material applied to a surface of the projection lens for partially blocking light emitted from the projection lens to alter an appearance of the vehicle lamp assembly.

In another embodiment, a vehicle lamp includes one or more LEDs mounted to a printed circuit board for producing light. An inner lens is coupled to the one or more LEDs for receiving light such that light enters along an edge of the inner lens and propagates through the inner lens via total-internal reflection before exiting. A projection lens is oriented adjacent the inner lens such that the projection lens receives light from the inner lens and projects the light from the vehicle lamp. A light blocking material is applied to at least a portion of the projection lens for altering an appearance of light emitted from the projection lens.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Visual effects may be incorporated into a light assembly for use on an exterior of a vehicle in a variety of ways. Embodiments of the present disclosure incorporate one or more coatings on lenses to prevent light transfer or allow partial light transfer from the light assemblies. The resulting projections provide custom lit appearances, for example, of varying intensity, texture, and/or color. Additionally, the projections may be used for satisfying vehicle lamp legal functions, welcome functions, autonomous driving functions, and/or logo functions.

Figure 1:
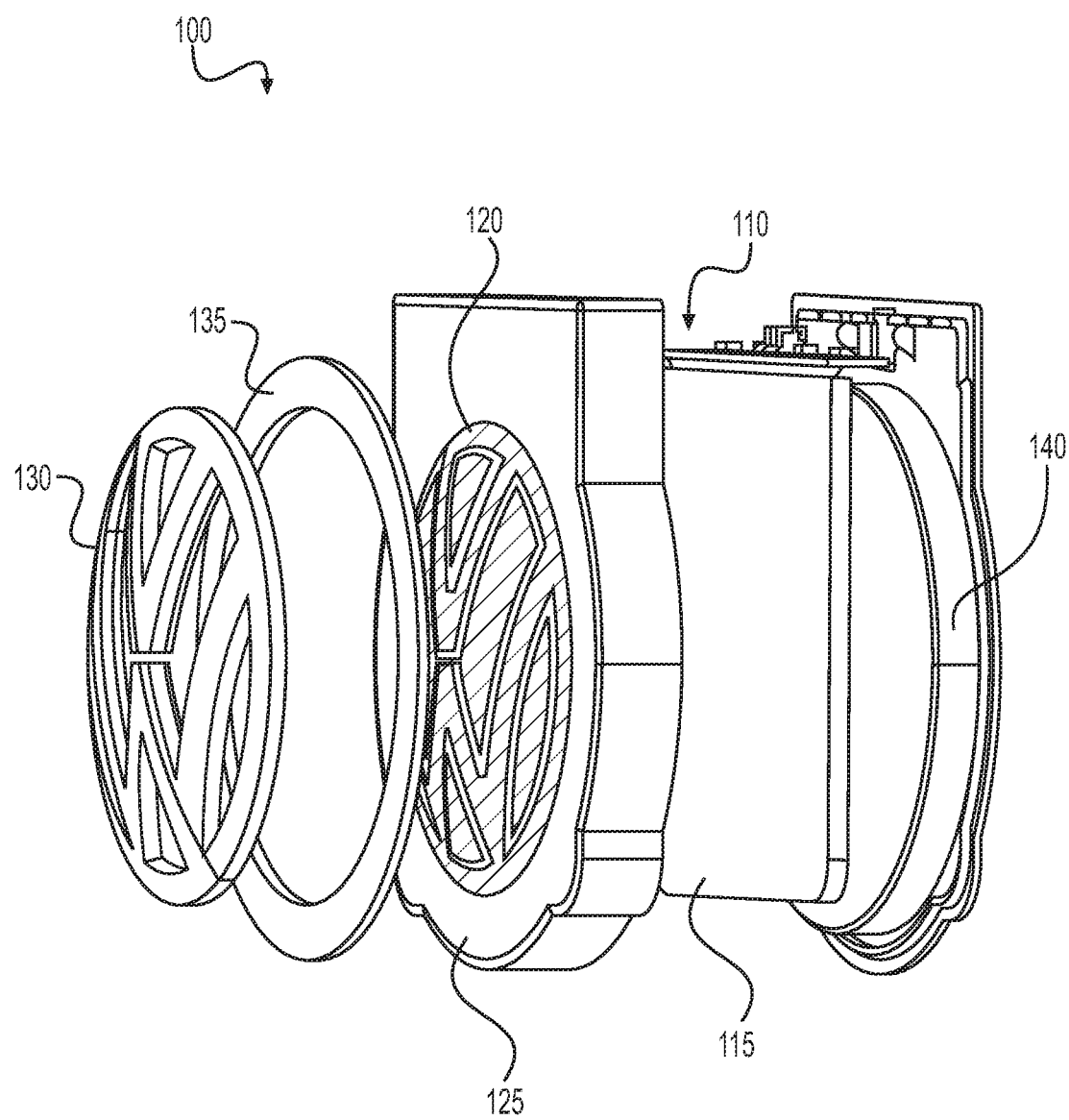
FIG. 1 is an exploded view of a vehicle lamp assembly, in an embodiment.

FIG. 1 is an exploded view of an exemplary vehicle lamp assembly 100 showing a stack-up of parts. A light source 110 includes, for example, one or more light emitting diodes (LEDs). The LEDs may be mounted on a printed circuit board (PCB) such that each of the one or more LEDs is individually controllable for turning on/off and dimming (e.g., via pulse width modulation). The LEDs may emit a colored light or white light. In certain embodiments, light emitted from light source 110 is introduced into an inner lens 115 along an edge (e.g., along a top edge of inner lens 115, as depicted in FIG. 1). In certain embodiments, inner lens 115 is a micro optic lens in which light propagates through the micro optic lens via total-internal reflection (TIR), and frustrated light exits the micro optic lens from a façade. In some embodiments, more than one inner lens may be used. The one or more inner lenses 115 are disposed adjacent a projection lens 120 such that light exiting the one or more inner lenses 115 illuminates the projection lens 120.

Projection lens 120 is adapted for shaping light. For example, projection lens 120 may be adapted for collimating light or shaping light in one or more directions (e.g., horizontal and/or vertical directions). Projection lens 120 may be a molded plastic part embedded in a frame 125. In certain embodiments, projection lens 120 and frame 125 are formed as a single part using a two-shot injection molding process. In certain embodiments, frame 125 forms a bezel, which may be transparent (e.g., clear) or opaque. Projection lens 120 and frame 125 may include coatings of light blocking paint or ink and/or semi-transparent paint or ink, as further described below.

A badge 130 faces the exterior of the vehicle lamp 100. Badge 130 may be fixed (e.g., welded, latched, or adhered with adhesive) directly to projection lens 120, or alternatively, an optional sealing gasket 135 may be disposed between badge 130 and projection lens 120. Badge 130 is for example a plastic part for displaying a marking (e.g., a logo, design, emblem, geometric shape, graphic, text, etc.). In certain embodiments, the plastic part includes a surface treatment (e.g., a chromed plastic part). Badge 130 may include open portions for allowing light from projection lens 120 to pass through.

A housing 140 is disposed adjacent inner lens 115. In certain embodiments, housing 140 is formed of a white material (e.g., a white resin material) adapted to substantially increase light output from light source 110 by reflecting light that exits inner lens 115. Specifically, light that exits inner lens 115 away from projection lens 120 is redirected back towards projection lens 120. In some embodiments, housing 140 includes a reflector made of a reflective material for reflecting light towards projection lens 120.

Figure 2:
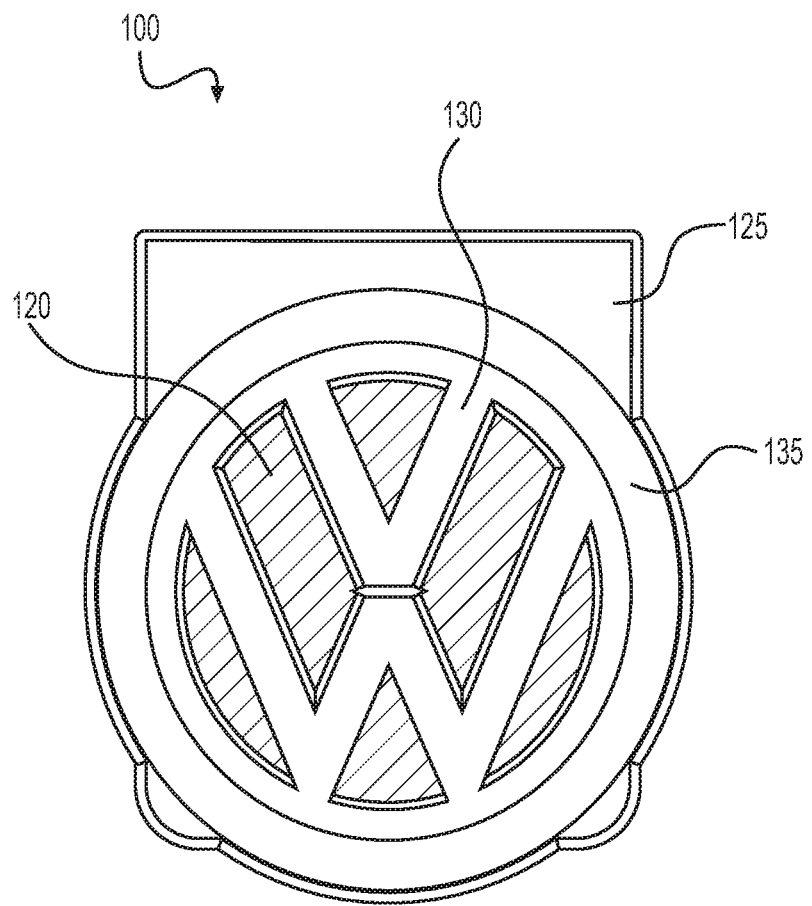
FIG. 2 is a front view of the vehicle lamp assembly of FIG. 1.

FIG. 2 is a front view of vehicle lamp assembly 100, FIG. 1. The front view as depicted in FIG. 2 represents the appearance of lamp 100 from outside a vehicle in an unlit state (in other words, light source 110 is off), with badge 130, sealing gasket 135, and frame 125 visible. Portions of projection lens 120 are visible through open portions of badge 130. Lamp assembly 100 may be mounted directly to a vehicle exterior, or it may be mounted inside another exterior lamp assembly, or it may be mounted on the outside of another exterior lamp assembly.

Figure 3:
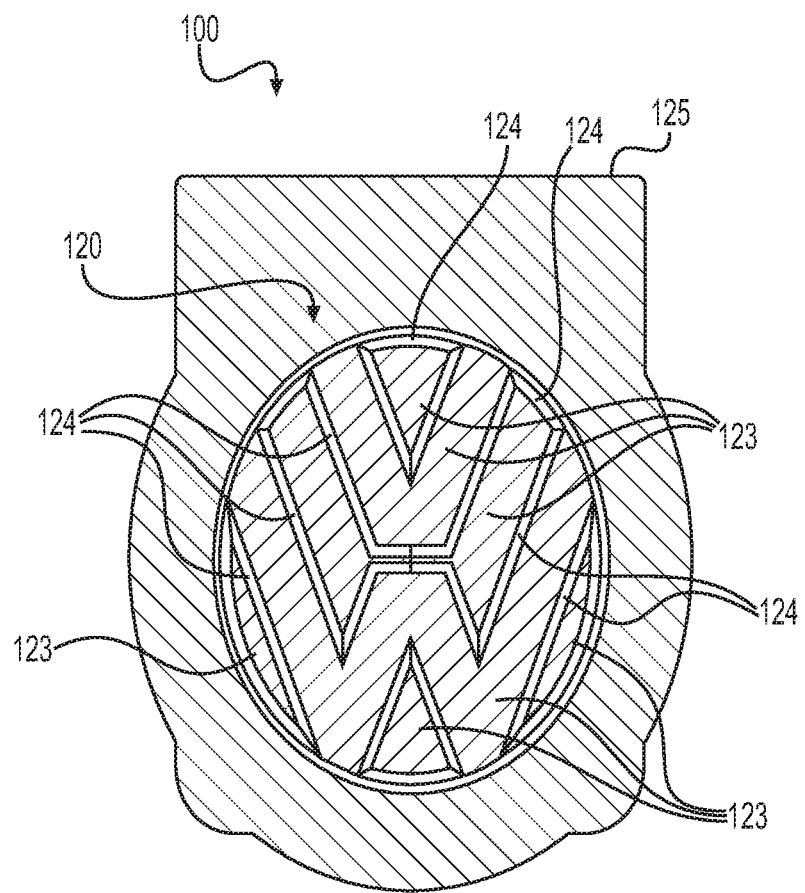
FIG. 3 is a front view of the vehicle lamp assembly of FIG. 1 with portions removed for viewing internal components.

FIG. 3 is a front view of vehicle lamp assembly 100 with badge 130 and gasket 135 removed. As depicted in FIG. 3, a light blocking material is applied to portions of projection lens 120 to form light blocking portions 123, which may include one or more light block paints or inks for substantially blocking light from inner lens 115. Alternatively, light blocking portions 123 may include one or more semitransparent paints or inks for partially blocking or dimming light. The semitransparent paints or inks may be applied in one or more layers for providing different colors and/or different levels of transparency. In certain embodiments, the light blocking material 123 is adapted to filter light from light source 110 thereby permitting light within a certain range of wavelengths to pass. For example, light source 110 and inner lens 115 may provide a white light source and the light blocking material 123 may be used to produce a certain color emitted from projection lens 120.

In some embodiments, light blocking portions 123 include a textured coating so as to create a textured appearance on the outside of projection lens 120. For example, the textured appearance may have the appearance of a fabric material such that projection lens 120 appears to include a backlit fabric when illuminated. The fabric-like pattern may be applied using a printing technique, such as pad printing for example, as further described below. Textured appearances may also be applied by via a tool (e.g., during molding). For example, the tool may itself have a textured surface that gets transferred during molding. Textured surfaces may be formed on a steel mold by blasting (e.g., with beads of sand) or by applying corrosive acids to eat away at the finished steel surface.

Projection lens 120 may be coated with one or more light block paints or inks using any process known in the art, such as pad printing, screen printing, hydrographic printing, painting, holography, or jet printing. U.S. Pat. No. 7,804,418 to Sullivan et al., the disclosure of which is hereby incorporated by reference in its entirety, provides an exemplary pad printing process for applying ink to lighting assemblies. Either the inner surface of projection lens 120 or the outer surface of projection lens 120 or both surfaces (e.g., see FIG. 6) may be coated with light blocking material. Coating inner surface of projection lens 120 is more effective for reducing light bleed from or to other lit areas. In certain embodiments, three-dimensional (3D) appearances may be formed using combinations of transparent light blocking material or combinations of transparent and opaque light blocking material applied to inner and outer surfaces of projection lens 120 based on a thickness of projection lens 120. In some embodiments, multi-color fabric lit appearances may be formed using combinations of semi-transparent light blocking material applied to either inner or outer surfaces of projection lens 120 or to both inner and outer surfaces of projection lens 120. In certain embodiments, inner portions of frame 125 may be partially coated with light blocking material.

Portions of projection lens 120 may be omitted from covering with light blocking material. In FIG. 3 for example, portions of projection lens 120 without light blocking material are indicated as unblocked portions 124. The blocked and unblocked portions of projection lens 120 may be adapted for altering a pattern and appearance of light emitted from projection lens 120. In certain embodiments, an image set is used to create a pattern of light blocking. An image set may be a series of images layered on top of one another. The image set may be transferred onto projection lens 120 via any suitable method such as pad printing.

As depicted in FIG. 3, frame 125 is coated with an opaque light blocking material, and portions of projection lens 120 are coated with a semi-transparent light blocking material 123, while unblocked portions 124 allow light to substantially pass.

Figure 4B:
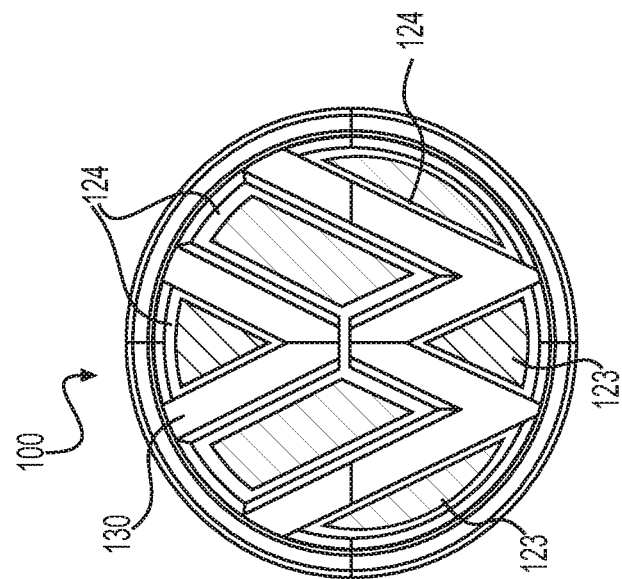
FIG. 4B is a front view of the vehicle lamp assembly of FIG. 4A in a lit state.
Figure 4A:
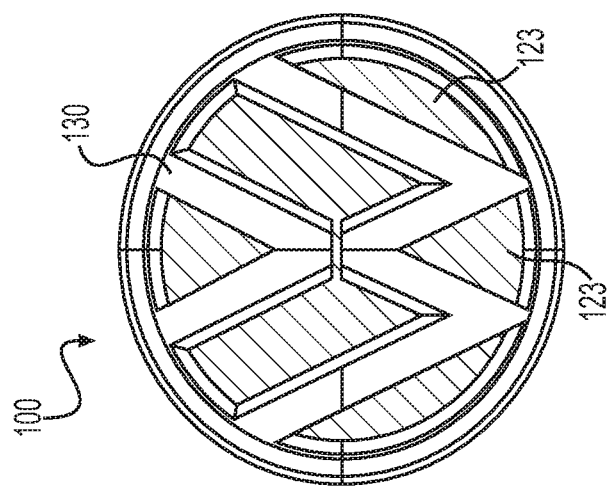
FIG. 4A is a front view of a vehicle lamp assembly in an unlit state, in an embodiment.

FIGS. 4A and 4B show portions of vehicle lamp assembly 100 in an unlit state (FIG. 4A) and a lit state (FIG. 4B). The unlit state is achieved when light source 110 is off and the lit state is achieved when light source 110 is on. Badge 130 is positioned in front of projection lens 120. Projection lens 120 includes light blocking portions 123 and unblocked portions 124 (not all portions are enumerated in FIGS. 4A and 4B for clarity of illustration). In the embodiment depicted in FIGS. 4A and 4B, the unblocked portions 124 are shaped to outline badge 130 such that the badge is highlighted by light penetrating through unblocked portions 124 when lit.

Figure 5:
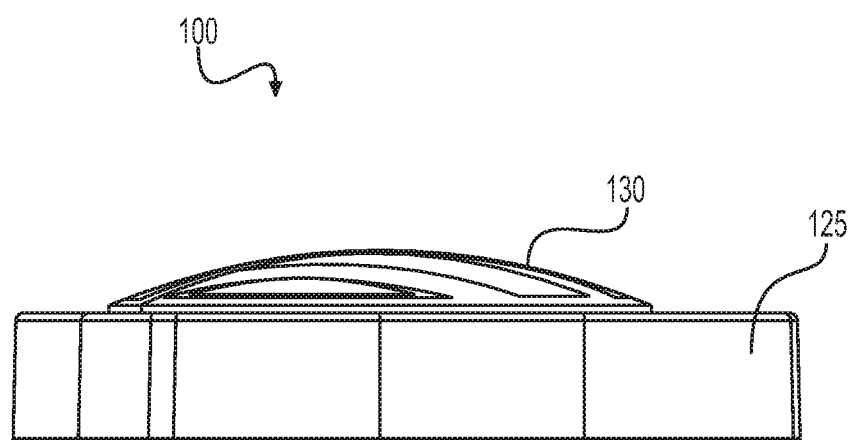
FIG. 5 is a side view of the vehicle lamp assembly of FIG. 1.

FIG. 5 is a side view of vehicle lamp assembly 100. As depicted from the side view of FIG. 5, badge 130 and the underlying projection lens 120 may have a curved or dome-like shape extending in a direction of light propagation.

Figure 6:
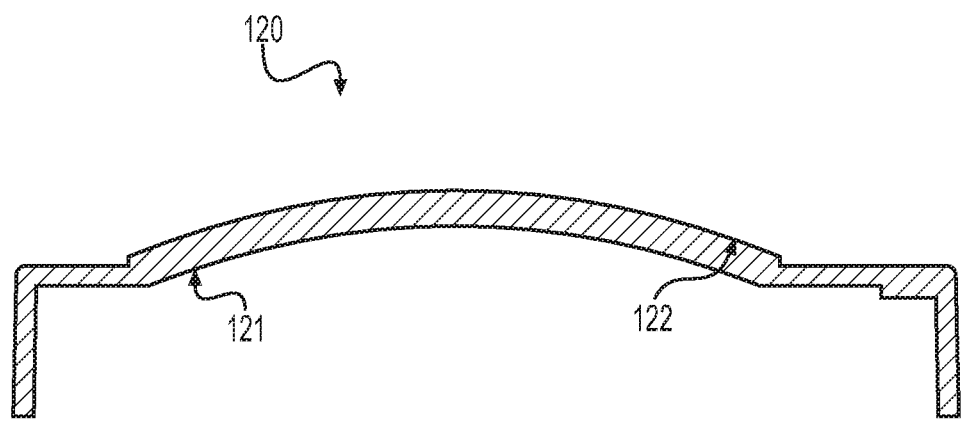
FIG. 6 is a cross-sectional side view of the vehicle lamp assembly of FIG. 5.

FIG. 6 is a cross-sectional side view of projection lens 120 showing an inner surface 121 and an outer surface 122. Either inner surface 121 or outer surface 122 or both surfaces of projection lens 120 may be coated with light blocking material.

In operation, light emitted from light source 110 illuminates the image set such that the semi-transparent light blocking material 123 glows with moderate intensity while the unblocked portions 124 are highlighted by brighter (e.g., unfiltered) light. Vehicle lamp assembly 100 may be used to prevent light transfer or allow partial light transfer to provide unique lit appearances, intensity, and color variations. In some embodiments, vehicle lamp assembly with light blocking 100 is adapted for providing signals to occupants of other vehicles, pedestrians, roadway sensors, and/or autonomous driving signals. Vehicle lamp assembly with light blocking 100 may provide vehicle lamp legal functions, welcome functions, autonomous driving signaling, and/or logo functions using static and/or dynamic effects. The intensity and color variations that are projected may be used with static and/or dynamic effect based on whether the vehicle is parked or moving. The color and intensity of light emitted may be subject to domestic and international vehicle lamp regulations for legal portions of the lamps assemblies, which may affect design of the light assemblies. For example, vehicle brake light assemblies must provide a specific total illumination surface area and illumination intensity.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A vehicle lamp assembly, comprising:
a light source for producing light;
one or more inner lenses that receives light from the light source and redirects the light;
a projection lens that receives light from the light redirected by the one or more inner lenses and shapes light for projecting from a vehicle lamp assembly;
a housing disposed adjacent the inner lens, the housing being formed of a white resin material adapted to substantially increase light output by reflecting light from the one or more inner lenses towards the projection lens; and
a light blocking material applied to a surface of the projection lens for partially blocking light emitted from the projection lens to alter an appearance of the vehicle lamp assembly.

2. The vehicle lamp assembly of claim 1, wherein the light source includes one or more light emitting diodes (LEDs) mounted on a printed circuit board such that each of the one or more LEDs is individually controllable for turning on/off and dimming.

3. The vehicle lamp assembly of claim 1, wherein the one or more inner lenses comprise a micro optic lens coupled to the light source such that light enters along an edge of the micro optic lens and propagates through the micro optic lens via total-internal reflection.

4. The vehicle lamp assembly of claim 1, further comprising a badge fixed to the projection lens for displaying a marking with open portions that allow light from the projection lens to pass.

5. The vehicle lamp assembly of claim 1, wherein a light blocking material is applied to portions of the projection lens for substantially blocking light in a predetermined pattern.

6. The vehicle lamp assembly of claim 1, wherein a semitransparent ink is applied in one or more layers for providing different levels of transparency through the projection lens.

7. The vehicle lamp assembly of claim 1, wherein an image set is applied to portions of the projection lens with semi-transparent light blocking material such that light emitted from the light source illuminates the image set causing it to glow with moderate intensity while unblocked portions of the projection lens are highlighted by unfiltered light.

8. The vehicle lamp assembly of claim 1, wherein the assembly is adapted to provide one or more of vehicle lamp legal functions, vehicle welcome functions, autonomous driving functions, or logo functions.

9. A vehicle lamp assembly, comprising:
a light source for producing light;
one or more inner lenses that receives light from the light source and redirects the light;
a projection lens that receives light from the light redirected by the one or more inner lenses and shapes light for projecting from a vehicle lamp assembly;
a light blocking material applied to a surface of the projection lens for partially blocking light emitted from the projection lens to alter an appearance of the vehicle lamp assembly, wherein portions of the light blocking material comprise a textured coating to create a textured appearance on the outside of the projection lens.

10. A vehicle lamp, comprising:
one or more LEDs mounted to a printed circuit board for producing light;
one or more inner lenses coupled to the one or more LEDs for receiving light such that light enters along an edge of each inner lens and propagates through each inner lens via total-internal reflection before exiting;
a projection lens oriented adjacent the one or more inner lenses such that the projection lens receives light from the one or more inner lenses and projects the light from the vehicle lamp; and
a light blocking material applied to at least a portion of the projection lens for altering an appearance of light emitted from the projection lens.

11. The vehicle lamp of claim 10, further comprising a frame adapted to house the projection lens wherein the frame and the projection lens are formed as a single part using a two-shot injection molding process.

12. The vehicle lamp of claim 10, wherein the vehicle lamp is adapted to provide one or both of static or dynamic lighting effects.

13. The vehicle lamp of claim 10, wherein the vehicle lamp is adapted to provide automotive signaling functions.

14. The vehicle lamp of claim 13, wherein the automotive signaling functions include signals to one or more of pedestrians, occupants of other vehicles, or roadway sensors.

15. The vehicle lamp of claim 10, further comprising an image set, the image set having a series of images layered on a surface of the projection lens thereby creating a light blocking pattern.

16. The vehicle lamp of claim 10, further comprising a badge fixed to the projection lens for displaying a marking with open portions that allow light from the projection lens to pass.

17. The vehicle lamp of claim 10, further comprising a housing disposed adjacent the one or more inner lenses, the housing being formed of a white resin material adapted to substantially increase light output by reflecting light from the one or more inner lenses towards the projection lens.

18. The vehicle lamp of claim 10, further comprising a reflector disposed adjacent the one or more inner lenses and opposite from the projection lens to increase light output of the vehicle lamp.

19. The vehicle lamp of claim 10, wherein a semitransparent ink is applied to a surface of the projection lens for providing semitransparent portions of the projection lens.

20. The vehicle lamp of claim 10, wherein a textured coating is applied to a surface of the projection lens to create a textured appearance on the outside of the projection lens.

* * * * *